Aug. 12, 1947.      E. POPPER      2,425,639

FLEXIBLE LINK DEVICE

Filed Aug. 1, 1945

INVENTOR.
EMIL POPPER
BY
ATTORNEY.

Patented Aug. 12, 1947

2,425,639

UNITED STATES PATENT OFFICE 2,425,639

FLEXIBLE LINK DEVICE

Emil Popper, Brooklyn, N. Y.

Application August 1, 1945, Serial No. 608,169

4 Claims. (Cl. 59—80)

This invention relates to new and useful improvements in a flexible link device. The invention is particularly intended for jewelry, as for example, for use in bracelets. However, it may also be used for other articles.

The dominating feature of the invention resides in an exceptionally simple and inexpensive construction for connecting adjacent members. It is particularly intended for connecting adjacent shell-like members which are disposed side to side in a line, and which have open bottom, or top faces. It is proposed to provide adjacent slots in adjacent side walls of said shell-like members. These slots are extended inwards from the open faces of the members. It is proposed to place connectors through the slots of adjacent side walls for flexibly connecting the members together. These connectors have enlarged end portions, or heads which are larger than the slots, whereby it is merely necessary to drop, or place the connectors in position through the slots. It is proposed to mount plates across the open faces of said members for covering and holding said connectors in position.

The flexible link device may be used with great advantage in the construction of bracelets, various kinds of jewelry, and other articles. All of the parts used in these articles may be stampings. The connectors may be stamped from sheet metal. Likewise the shell-like members and the plates may also be stamped, or cut from sheet material.

It is proposed to mount the plates across the open faces of the shell-like members by fashioning them to fit into the open faces and then securing them in position with solder, brazing, or the like.

Still further the invention proposes a flexible link device which is exceptionally simple, which may be manufactured and sold at a reasonable cost, and which is attractive and durable.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure—

Figure 1:
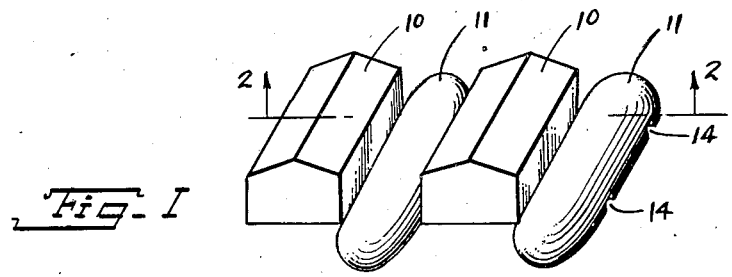
Fig. 1 is a perspective view of a flexible link device constructed in accordance with this invention.
Figure 2:
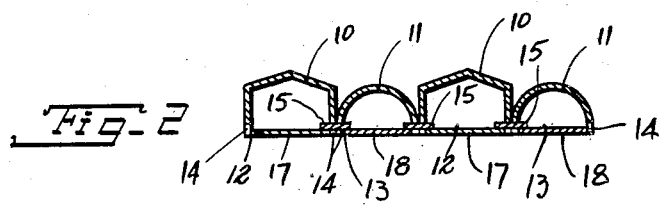
Fig. 2 is a sectional view taken on the line 2—2 of Fig. 1.
Figure 3:
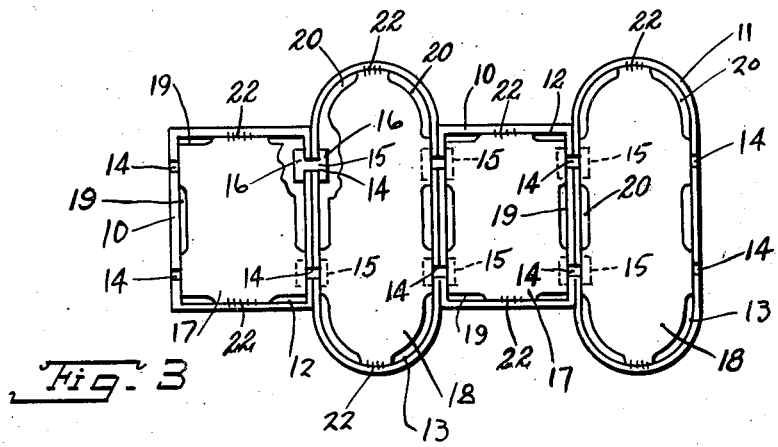
Fig. 3 is an enlarged bottom view of Fig. 1.

The flexible link device in accordance with this invention includes a plurality of adjacent shell-like members 10 and 11, disposed side to side in a line and having open bottom faces 12 and 13. Slots 14 are formed in adjacent positions in adjacent side walls of said shell-like members 10 and 11. These slots 14 are extended inwards a very short distance from the open faces of the members. The members 10 and 11 may be stamped from sheet metal. Furthermore they may be of any design, shape, and construction. If the flexible link device is intended to be used in a bracelet, or other jewelry, it is proposed that the shell-like members be decorative.

Connectors 15 extend through the slots 14 of adjacent side walls of said members 10 and 11 for flexibly connecting these members. Said connectors 15 have enlarged ends, or head 16. These enlarged ends or head 16 engage against the inner faces of the shell-like members, while the shanks of the connectors extend through the slots 14. Plates 17 and 18 are mounted across the open faces of said members 10 and 11, respectively, for covering and holding the connectors in position.

The plates 17 and 18 fit into the open faces of the members 10 and 11. Said plates 17 and 18 have cut away edge portions 19 and 20 respectively, forming openings through which the interiors of the members 10 and 11 are vented. This allows liquids used during the manufacture, and in cleaning the flexible link device, to flow freely out of the members 10 and 11. The plates 17 and 18 are mounted in position with solder 22, brazing, or the like, applied at several points.

The connectors 15, and the plates 17 and 18 may be formed by a simple stamping operation. The members 10 and 11 may be formed by stamping and drawing.

The connectors 15 flexibly connect the members 10 and 11 due to their inherent resiliency, and furthermore due to tolerances left between the parts.

While I have illustrated and described the preferred embodiment of my invention, it is to be understood that I do not limit myself to the precise construction herein disclosed and the right is reversed to all changes and modifications coming within the scope of the invention as defined in the appended claims.

Having thus described my invention, what I claim as new and desire to secure by United States Letters Patent is:

1. A flexible link device, comprising a plurality of adjacent shell-like members disposed side to side in a line and having open faces and adjacent slots in adjacent side walls, said slots being extended inwards from said open faces, connectors having heads at their ends and extended through said slots of adjacent side walls for flexibly connecting said members, and plates mounted across the open faces of said members for covering and holding said connectors in position.

2. A flexible link device, comprising a plurality of adjacent shell-like members disposed side to side in a line and having open faces and adjacent slots in adjacent side walls, said slots being extended inwards from said open faces, connectors having heads at their ends and extended through said slots of adjacent side walls for flexibly connecting said members, and plates mounted across the open faces of said members for covering and holding said connectors in position, said heads being disposed against the inner faces of said shell-like members while the shank portions of said connectors pass through said slots.

3. A flexible link device, comprising a plurality of adjacent shell-like members disposed side to side in a line and having open faces and adjacent slots in adjacent side walls, said slots being extended inwards from said open faces, connectors having heads at their ends and extended through said slots of adjacent side walls for flexibly connecting said members, and plates mounted across the open faces of said members for covering and holding said connectors in position, said connectors comprising sheet metal parts.

4. A flexible link device, comprising a plurality of adjacent shell-like members disposed side to side in a line and having open faces and adjacent slots in adjacent side walls, said slots being extended inwards from said open faces, connectors having heads at their ends and extended through said slots of adjacent side walls for flexibly connecting said members and plates mounted across the open faces of said members for covering and holding said connectors in position, said plates being engaged into the open faces of said members.

EMIL POPPER.